United States Patent
Daly et al.

(10) Patent No.: US 12,271,789 B2
(45) Date of Patent: Apr. 8, 2025

(54) INTERPRETABLE MODEL CHANGES

(71) Applicant: International Business Machines Corporation, Armonk, NY (US)

(72) Inventors: Elizabeth Daly, Dublin (IE); Rahul Nair, Dublin (IE); Oznur Alkan, Dublin (IE); Massimiliano Mattetti, Dublin (IE); Dennis Wei, Sunnyvale, CA (US); Yunfeng Zhang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 17/197,535

(22) Filed: Mar. 10, 2021

(65) Prior Publication Data

US 2022/0292391 A1    Sep. 15, 2022

(51) Int. Cl.
G06N 20/00 (2019.01)
G06N 5/02 (2023.01)

(52) U.S. Cl.
CPC ............ *G06N 20/00* (2019.01); *G06N 5/027* (2013.01)

(58) Field of Classification Search
CPC .......... G06N 20/00; G06N 5/027; G06N 5/01; G06N 5/04
See application file for complete search history.

(56) References Cited

U.S. PATENT DOCUMENTS

| | | |
|---|---|---|
| 8,533,222 B2 | 9/2013 | Breckenridge et al. |
| 8,887,286 B2 | 11/2014 | Dupont et al. |
| 10,324,951 B1 | 6/2019 | Miller et al. |
| 10,482,183 B1 | 11/2019 | Vargas et al. |
| 10,510,022 B1 | 12/2019 | Tharrington, Jr. et al. |
| 10,552,002 B1 | 2/2020 | Maclean et al. |
| 10,558,554 B2 | 2/2020 | Bhandarkar et al. |
| 2009/0091443 A1 | 4/2009 | Chen et al. |
| 2016/0071027 A1 | 3/2016 | Brand et al. |
| 2016/0371601 A1 | 12/2016 | Grove et al. |
| 2019/0056918 A1 | 2/2019 | Langdon |
| 2019/0156216 A1 | 5/2019 | Gupta et al. |
| 2020/0090038 A1 | 3/2020 | Teredesai et al. |
| 2020/0097439 A1 | 3/2020 | Sinay et al. |
| 2020/0184494 A1 | 6/2020 | Joseph et al. |
| 2020/0250556 A1 | 8/2020 | Nourian et al. |

(Continued)

FOREIGN PATENT DOCUMENTS

WO    2017201107 A1    11/2017

OTHER PUBLICATIONS

Wang et al., "Bayesian Rule Sets for Interpretable Classification," 2016 IEEE 16th International Conference on Data Mining (ICDM), Barcelona, Spain, 2016, pp. 1269-1274, doi: 10.1109/ICDM.2016. 0171. (Year: 2016).*

(Continued)

*Primary Examiner* — Li Wu Chang
(74) *Attorney, Agent, or Firm* — Gavin Giraud

(57) ABSTRACT

In a method for interpreting output of a machine learning model, a processor receives a first interpretable rule set. A processor may also receive a second interpretable rule set generated from a dataset and model-predicted labels classifying the dataset. A processor may also generate a difference metric and mapping between the first interpretable rule set and the second interpretable rule set.

20 Claims, 6 Drawing Sheets

(56) References Cited

U.S. PATENT DOCUMENTS

2020/0279140 A1    9/2020  Pai et al.

OTHER PUBLICATIONS

Fletcher et al., Measuring the Similarity between Rule Lists, 2016, In Proc. of the 14th Australasian Data Mining Conference (AusDM) At: Canberra, Australia, Dec. 6-8, vol. 170 (Year: 2016).*

Zhang et al., Diverse Rule Sets, 2020 In Proceedings of the 26th ACM SIGKDD International Conference on Knowledge Discovery & Data Mining (KDD '20). Association for Computing Machinery, New York, Ny, USA, 1532-1541. https://doi.org/10.1145/3394486.3403204 (Year: 2020).*

Letham et al., "Interpretable classifiers using rules and Bayesian analysis: Building a better stroke prediction model", 2019, Annals of Applied Statistics 2015, vol. 9, No. 3, 1350-1371, https://doi.org/10.48550/arXiv.1511.01644 (Year: 2019).*

Lakkaraju et al., Interpretable Decision Sets: A Joint Framework for Description and Prediction, 2016, In Proceedings of the 22nd ACM SIGKDD International Conference on Knowledge Discovery and Data Mining (KDD '16). Association for Computing Machinery (Year: 2016).*

Bu et al., "Model Change Detection with Application to Machine Learning,", 2019, ICASSP 2019—2019 IEEE International Conference on Acoustics, Speech and Signal Processing (ICASSP), Brighton, UK, pp. 5341-5346, doi: 10.1109/ICASSP.2019.8682153. (Year: 2019).*

Arya et al., "One Explanation Does Not Fit All: A Toolkit And Taxonomy Of AI Explainability Techniques", Cornell University, arXivLabs, Sep. 6, 2019, 18 pages, <https://arxiv.org/abs/1909.03012>.

Baena-Garcia et al., "Early Drift Detection Method", Proceedings of the Fourth International Workshop on Knowledge Discovery From Data Streams, Sep. 18-22, 2006, Berlin, Germany, 10 pages, <http://www.machine-learning.eu/iwkdds-2006/>.

Bansal et al., "Updates in Human-AI Teams: Understanding and Addressing the Performance/Compatibility Tradeoff", Proceedings of the Thirty-third AAAI Conference on Artificial Intelligence, Jan. 27-Feb. 1, 2019, Honolulu, Hawaii, 10 pages.

Dash et al., "Boolean Decision Rules via Column Generation", Proceedings of the 32nd Conference on Neural Information Processing Systems, Dec. 2-8, 2018, Montréal, Canada, 11 pages.

Dries et al., "Adaptive Concept Drift Detection", Statistical Analysis and Data Mining: The ASA Data Science Journal, vol. 2, Issue 5-6, Nov. 18, 2009, pp. 311-317.

Firat et al., "Constructing Classification Trees Using Column Generation", Cornell University, arXivLabs, Jul. 11, 2019, 29 pages, <https://arxiv.org/abs/1810.06684v1>.

Margot, Vincent, "A Rigorous Method To Compare Interpretability Of Rule-Based Algorithms", Cornell University, arXivLabs, Apr. 7, 2020, 9 pages, <https://arxiv.org/abs/2004.01570>.

Rajapaksha et al., "LoRMIKA: Local Rule-Based Model Interpretability With k-Optimal Associations", Information Sciences, vol. 540, Nov. 2020, pp. 221-241.

Sutton et al., "Data Diff: Interpretability, Executable Summaries of Changes In Distributions For Data Wrangling", Proceedings of the 24th ACM SIGKDD Conference on Knowledge Discovery and Data Mining (KDD), Aug. 19-23, 2018, London, United Kingdom, 10 pages.

* cited by examiner

INTERPRETABLE MODEL CHANGES

BACKGROUND

The present invention relates generally to the field of model interpretation, and more particularly to interpreting model changes based on comparison of rules from different models or versions of models.

Machine learning models are becoming more prevalent as a tool for categorizing datasets with labels. Many machine learning models label the datasets without interpretable reasons for the categorization. For example, a machine learning model may reflect considerations such as bias, fairness, ability to explain, adversarial robustness, and out-of-distribution generalization in a way that may hinder user trust in the machine learning model. Accuracy is therefore not the sole determinant of model performance, and human review of the labeled datasets can garner varying amounts of trust in each machine learning model.

Machine learning models can inaccurately label a dataset, and the inaccuracies differ widely between machine learning models. This variety of possible inaccurate labeling diminishes the ability of a user to understand model behavior through classical accuracy metrics and other summary statistics. Furthermore, the differences between versions of a machine learning model (i.e., before and after an update) may not be revealed by summary metrics that mask crucial qualitative differences.

When a machine learning model is initially developed, the developers spend time and resources understanding, analyzing, and explaining the resulting predictions. After the model is deployed, developers use concept drift detection to monitor the relationship between features and target. Specifically, concept drift detects whether a change has occurred over time. Concept drift in data streams may be detected by looking at empirical loss statistics, or changes in linear regression models. Developers may also use empirical difference tests to detect whether a change between specific parameters of two models is significant. Developers may also use approaches ranging from weighted ensemble classifiers to a self-adjusting memory (SAM) model, or a k-nearest-neighbor (kNN) algorithm.

SUMMARY

According to one embodiment of the present invention, a computer-implemented method, a computer program product, and a computer system for generating a difference metric for a machine learning model are provided. A processor receives a first interpretable rule set. A processor generates model-predicted labels from a dataset using the machine learning model. A processor generates a second interpretable rule set comparing the dataset with the model-predicted labels. A processor generates a difference metric and mapping between the first interpretable rule set and the second interpretable rule set.

For the embodiments disclosed herein, the difference metric provides the advantage of being able to determine interpretable changes between machine learning models. As the nature of machine learning models does not permit direct interpretable metrics during the classification, the embodiments disclosed herein enable a person that has grown accustomed to a certain machine learning model to compare and contrast the classifications using interpretable conjunctions and/or rules. The difference metrics may include a comparison view highlighting the differences between the first interpretable rule set and the second interpretable rule set, an edit distance between the first interpretable rule set and the second interpretable rule set, or a set of descriptions about the changes between the first interpretable rule set and the second interpretable rule set.

The comparisons between rules sets are not limited to difference metrics between machine learning models. For example, the first interpretable rule set may include user-designated rules, rules based on ground truth labels, or rules generated from separate model-predicted labels.

In certain embodiments, a computer-implemented method for generating a difference metric between a first machine learning model and a second machine learning model may be provided. A processor may receive a first interpretable rule set generated from a dataset and first model-predicted labels from the first machine learning model classifying the dataset. A processor may also receive a second interpretable rule set generated from the dataset and second model-predicted labels from the second machine learning model classifying the dataset. A processor may also generate a difference metric and mapping between the first interpretable rule set and the second interpretable rule set.

In certain embodiments, a computer-implemented method for generating a difference metric between a first machine learning model and a second machine learning model is provided. A processor may generate first model-predicted labels from a dataset using the first machine learning model. A processor may generate a first interpretable rule set comparing the dataset with the first model-predicted labels. A processor may generate second model-predicted labels from the dataset using the second machine learning model. A processor may generate a second interpretable rule set comparing the dataset with the second model-predicted labels. A processor may generate a difference metric and mapping between the first interpretable rule set and the second interpretable rule set.

DETAILED DESCRIPTION

While machine learning models have increased in complexity and accuracy, embodiments of the present invention recognize that demand for increasing the interpretability of machine learning models may be increasing as well. In particular, the disclosed embodiments include components of a machine learning model environment for detecting that change has occurred between different models (or versions of the same model), and more specifically to detecting what has changed between different models. Thus, the disclosed embodiments enable developers of the models to understand model changes, with an understanding that goes beyond summary statistics. To provide understanding of the differences and changes, the disclosed embodiments include rules generators that use the labeled output from a machine learning model to assign interpretable rules for the categorization performed by the machine learning model. Furthermore, the interpretable rules will be grounded in a grounding rule set and a rules comparator receives the grounding rule set and the interpretable rule set in order to generate a difference metric and mapping for judging how the machine learning model has labeled data differently.

Figure 1:
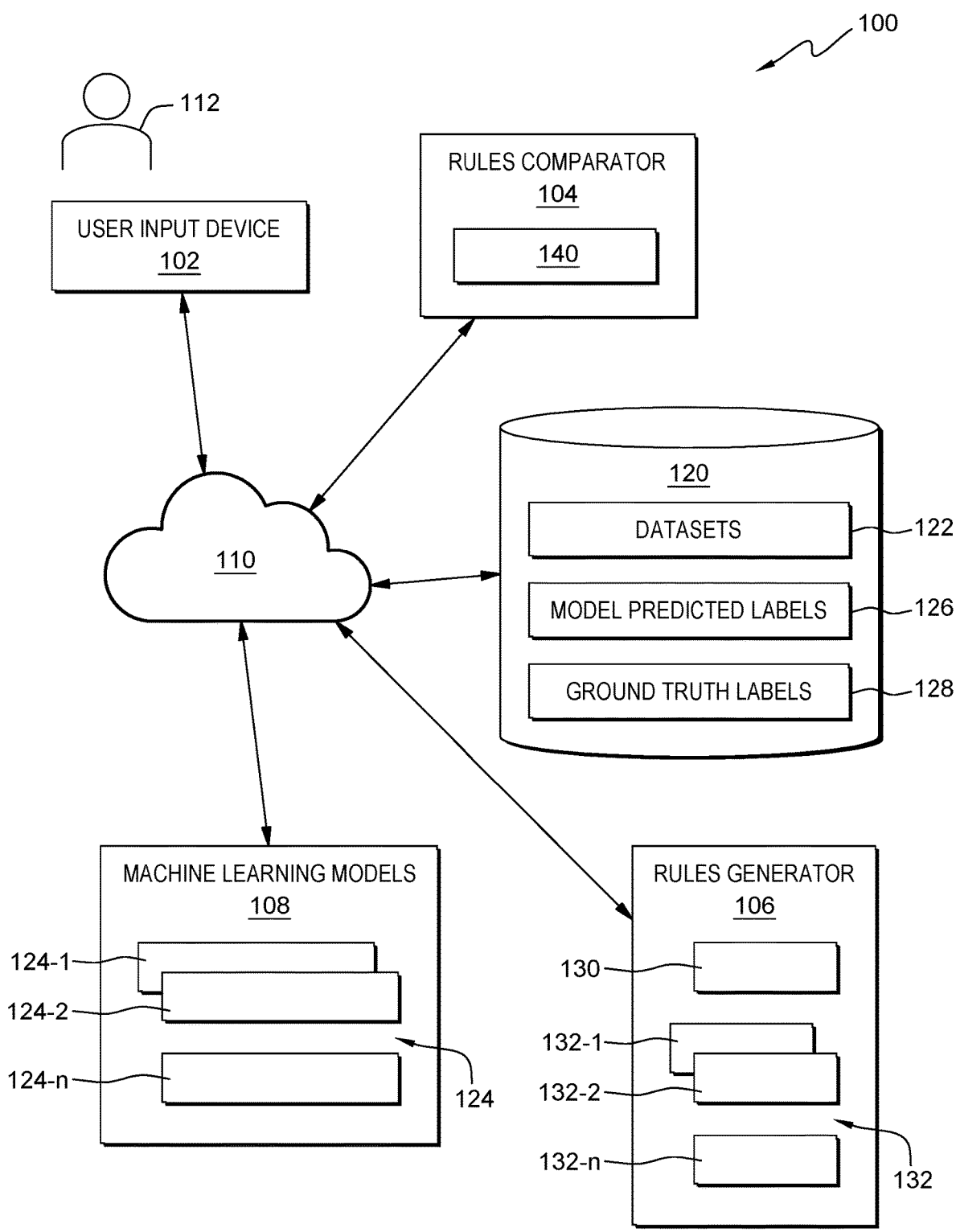
FIG. 1 is a functional block diagram illustrating a machine learning model environment, in accordance with an embodiment of the present invention.

Turning now to the drawings, FIG. 1 depicts a diagram of a machine learning model environment 100 in accordance with one embodiment of the present invention. FIG. 1 provides only an illustration of one embodiment and does not imply any limitations with regard to the environments in which different embodiments may be implemented.

The environment 100 includes a user input device 102, a rules comparator device 104, a rules generator device 106, and a machine learning model device 108. In certain embodiments, as illustrated, the user input device 102, the rules comparator device 104, the rules generator device 106, and the machine learning model device 108 are communicatively coupled via a communication network 110. The communication network 110 may be a local area network (LAN), a wide area network (WAN) such as the Internet, any combination thereof, or any combination of connections and protocols that will support communications between the user input device 102, the rules comparator device 104, the rules generator device 106, and the machine learning model device 108 in accordance with embodiments of the invention. The communication network 110 may include wired, wireless, or fiber optic connections. In certain embodiments, the user input device 102, the rules comparator device 104, the rules generator device 106, and the machine learning model device 108 may communicate without requiring the communication network 110, instead communicating via one or more dedicated wire connection or other forms of wired and wireless electronic communication. A user 112 may access the communication network 110 through the user input device 102.

The environment 100 includes a data storage device 120 for storing digital information. The data storage device 120 may include read-only memory ("ROM"), random access memory ("RAM") (e.g., dynamic RAM ("DRAM"), synchronous DRAM ("SDRAM"), and the like), electrically erasable programmable read-only memory ("EEPROM"), flash memory, a hard disk, a secure digital ("SD") card, other suitable memory devices, or a combination thereof. The data storage device 120 is illustrated separately from the user input device 102, the rules comparator device 104, the rules generator device 106, and the machine learning model device 108, but the data storage device 120 may be incorporated with any or each of the user input device 102, the rules comparator device 104, the rules generator device 106, and the machine learning model device 108. The data storage device 120 stores, among other potential storage items, datasets 122 for use by machine learning models 124 running on the machine learning model device 108.

The machine learning models 124 may generate model-predicted labels 126 that are also stored on the data storage device 120. The model-predicted labels 126 may include a set of labels from each of the machine learning models 124-1, 124-2, 124-n. The data storage device 120 may also store ground truth labels 128, that can differ from the model-predicted labels 126. The rules generator device 126 runs a rules generator 130 that learns an interpretable rule set 132 as a surrogate using the model-predicted labels 126 and the datasets 122 from each of the machine learning models 124. For example, the rules generator 130 may include a Boolean Rule via Column Generation (BRCG) that generates a Boolean rule of the form if (condition) then 'True' else 'False,' where condition may include a disjunctive normal form (DNF, OR of ANDs). Such a DNF rule constitutes an (unordered) rule set for the positive class. It is equally possible to learn a DNF rule/rule set for the negative class, which is equivalent to a conjunctive normal form (CNF) rule for the positive class.

The interpretable rule sets 132 are processed by a rules comparator algorithm 140 to determine differences between the interpretable rule sets 132 generated from the different machine learning models 124. For example, the rules comparator algorithm 140 may produce an assignment of rules that are similar between a first interpretable rule set 132-1 (generated from the first machine learning model 124-1) and a second interpretable rule set 132-2 (generated from the second machine learning model 124-2). Similar rules share related literals (e.g., variable, predicate, or value, as explained in detail below) such that the rules comparator algorithm 140 recognizes that the rules may have interpretable information in common. The rules comparator algorithm 140 may produce no assignment if the second interpretable rule set 132-2 has fewer rules than the first interpretable rule set 132-1. Differences between corresponding rules can then be highlighted when the rules comparator algorithm 140 generates a difference metric and mapping between the first interpretable rule set 132-1 and the second interpretable rule set 132-2.

Embodiments of the present invention recognize that one challenge in generating the difference metric in practice is that minor changes in the datasets 122, that are used to train the machine learning models 124, can yield interpretable rule sets 132 that have interpretable rules that do not share any literals in common. For example, sampling variability can produce significantly diverging structures in the interpretable rule sets 132. Furthermore, even for datasets 122 that use the same training data points, the rules generator 130 can have several clauses that use different variables but have similar fidelity due to strong correlations between the variables. The disclosed embodiments therefore include generating a difference metric utilizing mapping to increase understanding between the interpretable rule sets 132.

For example, mapping may include grounding to stabilize the structure of the interpretable rule sets 132. Grounding includes modifying the BRCG formulation by introducing a penalty term in the objective function to make previously generated rules from a first interpretable rules set 132-1 more likely to persist in the second interpretable rules set 132-2. Other instances of mapping may include highlighting the similar rules/conjunctions between the first interpretable rules set 132-1 and the second interpretable rules set 132-2. Since the number and scope of the rules in the interpretable rules sets 132 may be large and varied, the rules comparator algorithm 140 maps a rule in the first interpretable rules set 132-1 dealing with one particular variable within the data (e.g., age or education of an applicant, location or amount of precipitation of a property or area, date of an event) to the same or similar variable in the second interpretable rules set 132-2.

Figure 2:
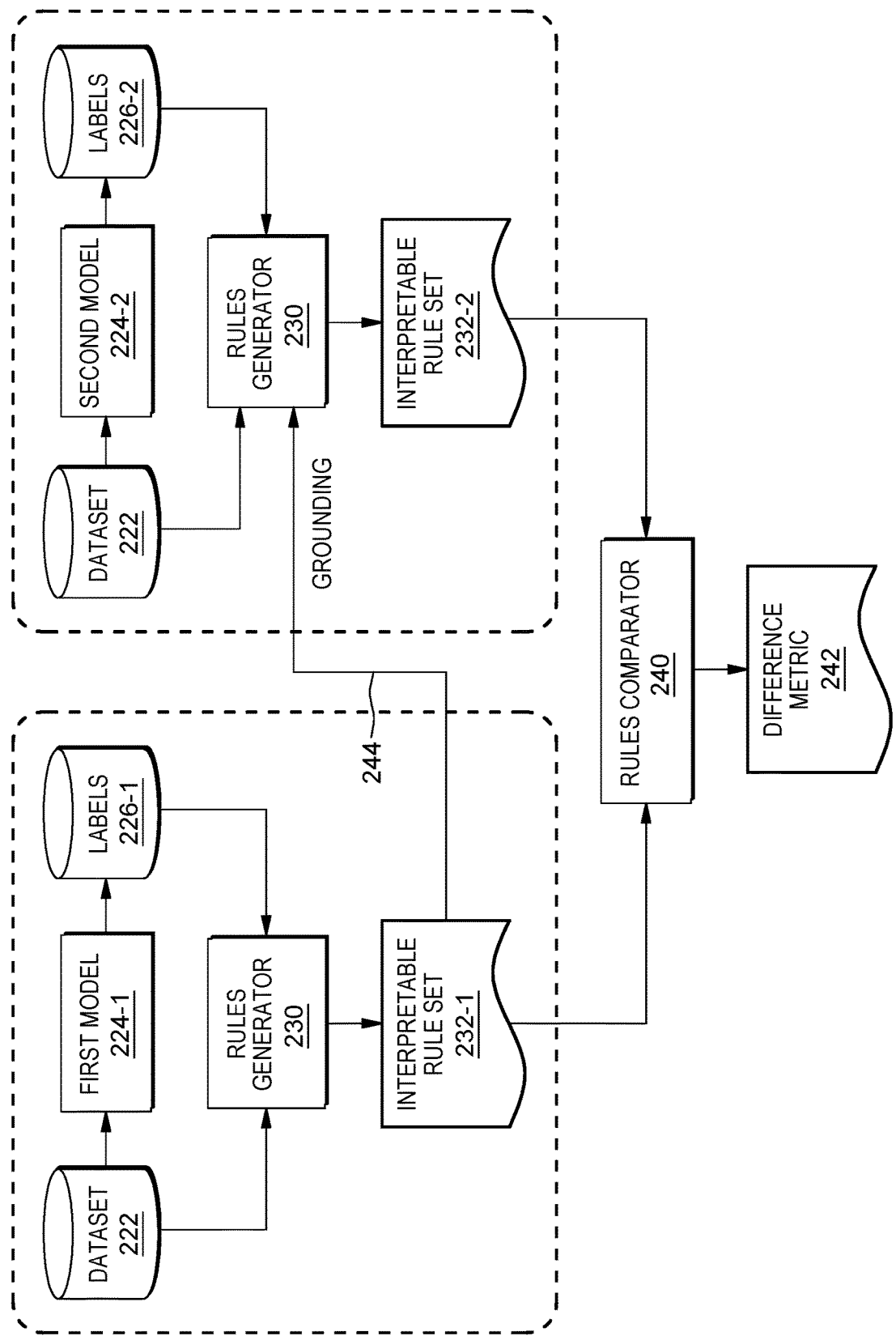
FIGS. 2-4 are conceptual block diagrams illustrating processes for generating difference metrics of interpretable rule sets.

FIG. 2 is a conceptual block diagram illustrating a rules comparator 240 generating a difference metric 242 from a first machine learning model 224-1 and a second machine learning model 224-2, in accordance with an embodiment of the present invention. Developers train the first machine learning model 224-1 with a first training set, and train the second machine learning model 224-2 with a second training set. The training sets used to train the first machine learning model 224-1 and the second machine learning model 224-2 may differ in a variety of types, sources, or time periods of collection. For example, the first training set and the second training set may include data points from the same data source, but captured at different times. The training sets may also differ with regard to the data source, as well.

Once training is complete, a dataset 222 is fed into both the first machine learning model 224-1 and the second machine learning model 224-2, which generate first model-predicted labels 226-1 and second model-predicted labels 226-2, respectively. The model-predicted labels 226-1, 226-2 are binarized as in a decision tree by thresholding with multiple thresholds for continuous features, and by the usual one-hot encoding for categorical features. A rules generator 230 takes the dataset 222 and the first model-predicted labels 226-1 and generates a first interpretable rules set 232-1. As mentioned above, the first interpretable rules set 232-1 may be generated through BRCG.

Specifically, as part of the BRCG process, the rules generator 230 evaluates the possible conjunctions of the binary features in the first model-predicted labels 226-1. The possible conjunction may include a list of Boolean expressions in Conjunctive Normal Form (CNF). Each CNF rule contains a list of literals in the form of <variable, predicate, value>. The variables may include categories such as "age" or ""education". The predicates may include "=" "<" or ">", for example. The values may be any recordable value. The rules generator 230 determines whether including each conjunction increases the accuracy of representing the first model-predicted labels 226-1 from the dataset 222. To do so, the rules generator 230 is programmed with constraints on which conjunctions to include in the first interpretable rule set 232-1.

For example, one constraint may include the rules generator 230 associating each conjunction (or a subset of conjunctions, as the dataset 222 may include too many conjunctions to review efficiently) with a complexity (e.g., the number of participating literals). The rules generator 230 may then compile the set of conjunctions that minimizes total Hamming loss, where the Hamming loss for each data point in the dataset 222 is the number of conjunctions that must be added or removed to classify it correctly. Another constraint may force the rules generator 230 to determine incorrect classification, i.e., a false negative. False positives must be removed if they satisfy multiple selected conjunctions. The rules generator 230 may also include constraints that identify false negatives. For example, a constraint may be that for each positive sample from the first model-predicted labels 226-1, the rules generator 230 includes i) a false negative, or ii) a rule that correctly represents this observation. Another constraint may bound the total complexity of the first interpretable rule set 232-1 by a parameter. Another constraint may restrict the decision variables to be binary.

The rules generator 230 may use these constraints to complete an iterative column generation (CG) procedure. Each conjunction is added to the first interpretable rules set 232-1 only if the conjunction improves the representation by the first interpretable rules set 232-1 of the first model-predicted labels 226-1.

The rules generator 230 generates the second interpretable rule set 232-2 through a similar process of conjunction evaluation. In the generation of the second interpretable rule set 232-2, however, the rules generator 230 may use "grounding" (indicated by the arrow identified as 244) from the first interpretable rule set 232-1. For generating a grounded rule set, the rules generator 230 assumes a known set of conjunctions. The rules generator 230 may then i) add new conjunctions to the first interpretable rule set 232-1; ii) delete conjunctions from the first interpretable rule set 232-1; or iii) modify the literals (e.g. value, predicate or both) to complete the second interpretable rule set 232-2. Each time one of the rules from the first interpretable rule set 232-1 is violated, the rules generator 230 recognizes a penalty to the second interpretable rule set 232-2. The rules generator 230 thus includes the dataset 222, the grounding constraints from the first interpretable rule set 232-1, and the second model-predicted labels 226-2 to solve the grounded problem by a CG procedure similar to the first interpretable rule set 232-1.

The interpretable rule sets generated by the rules generator 230 may be grounded on constraints provided by entities other than the rules generator 230.

Figure 3:
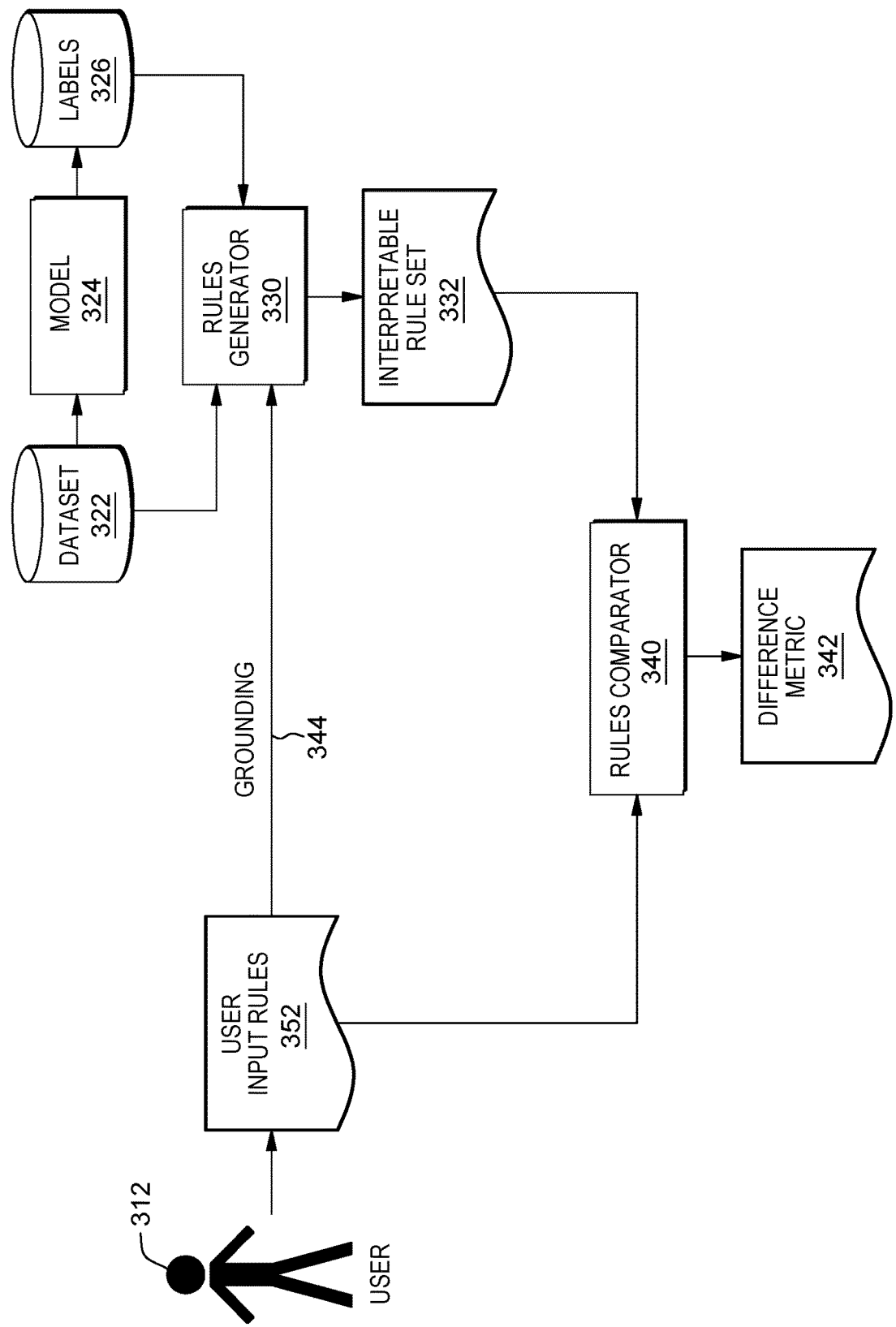

FIG. 3 is a conceptual block diagram illustrating a rules comparator 340 generating a difference metric 342 from a set of user input rules 352 and a machine learning model 324, in accordance with an embodiment of the present invention. As described above, a user 312 may have a familiarity with the data in a dataset 322, such that the user 312 prefers to have certain constraints represented, at least to some degree, within an interpretable rule set 332 based on the machine learning model 324. A rules generator 330, therefore, may use grounding 344 from the user input rules 352 when generating the interpretable rule set 332.

Figure 4:
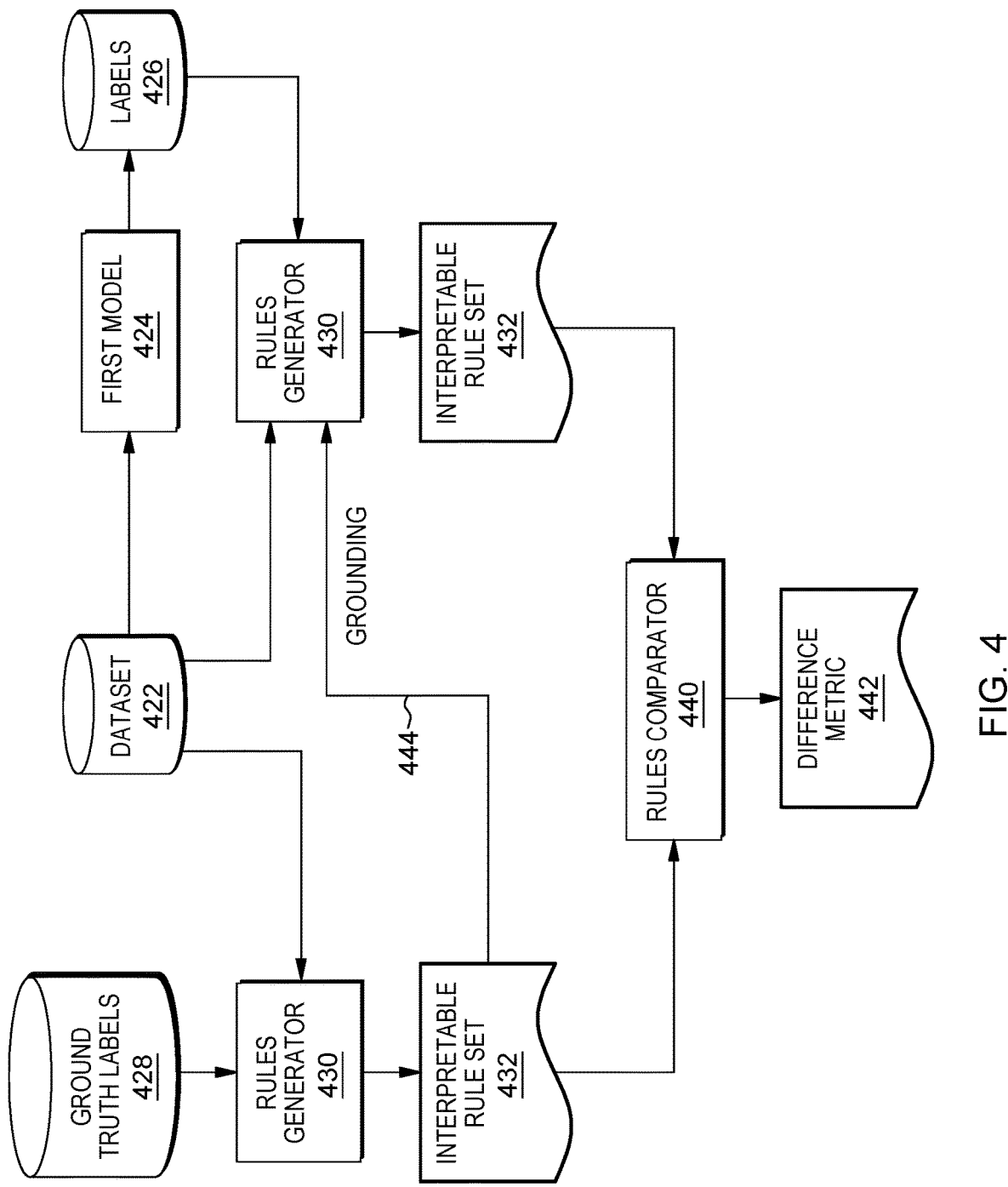

FIG. 4 is a conceptual block diagram illustrating a rules comparator 440 generating a difference metric 442 from ground truth labels 428 and a machine learning model 424, in accordance with an embodiment of the present invention. A rules generator 430 generates a ground truth interpretable rule set 432-1 that derives the conjunctions from binary features between the ground truth labels 428 and a dataset 422. The ground truth labels 428 are based on the verified actual classifications for each of the data points in the dataset 422, rather than any predicted or estimated classifications. The ground truth interpretable rule set 432-1 may then be used as grounding 444 for the rules generator 430 to generate a second interpretable rule set 432-2 conceptually representing the machine learning model 424. The rules generator 430 may generate the second interpretable rule set 432-2 similarly (e.g., BRCG) to the grounded rules set described above (i.e., the second interpretable rule set 232-2 and the interpretable rule set 332).

Figure 5:
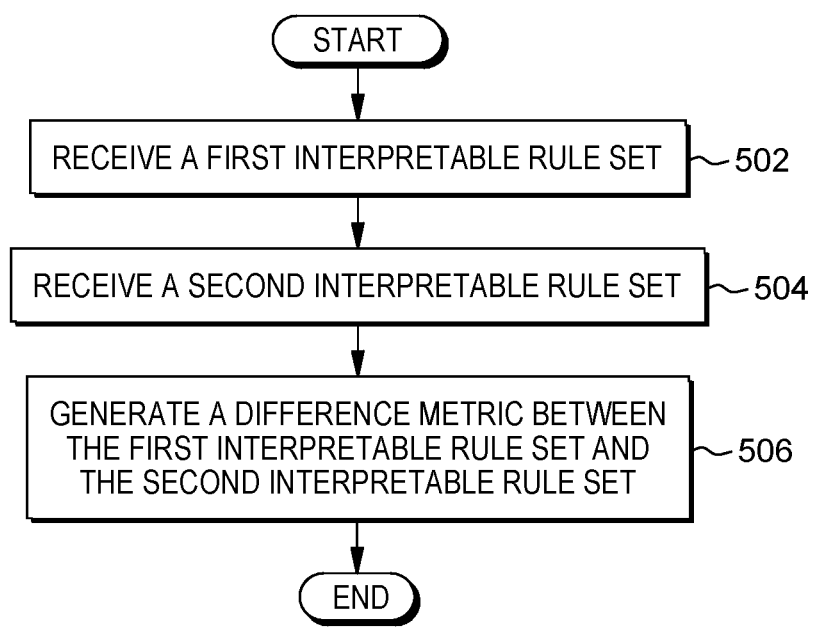
FIG. 5 is a flowchart depicting operational steps of a rules comparator program, in accordance with an embodiment of the present invention.

FIG. 5 is a flowchart depicting operational steps of the rules comparator program 140 of FIG. 1, in accordance with an embodiment of the present invention. The operational steps may also be performed by any of the other rules comparators in the embodiments described herein. The rules comparator program 140 receives a first interpretable rule set 132-1 (block 502). As described in the various embodiments above, the first interpretable rule set may include a rule set (e.g., first interpretable rule set 232-1) generated by a rules generator. The first interpretable rule set may also include a set of rules selected by a user (e.g., user input rules 352). Additionally or alternatively, the first interpretable rule set received by the rules comparator program 140 may include a set of rules based on a relationship between ground truth and a dataset (ground truth interpretable rule 432-1).

The rules comparator 140 may also receive a second interpretable rule set 132-2 (block 504). The second interpretable rule set may include rules generated from a dataset 122 and model-predicted labels 126 classifying the dataset 122. The second interpretable rule set 132-2 may be grounded by the first interpretable rule set 132-1. Grounding includes penalizing the rules generator 130 when the rules of the second interpretable rule set 132-2 differ from the first interpretable rule set 132-1, as described in detail above.

After the rules comparator 140 receives the first interpretable rule set 132-1 and the second interpretable rule set 132-2, the rules comparator 140 generates a difference metric and mapping between the first interpretable rule set and the second interpretable rule set (block 506). For example, the difference metric may include any of: a comparison view highlighting the differences between the first interpretable rule set 132-1 and the second interpretable rule set 132-2; an edit distance between the first interpretable rule set 132-1 and the second interpretable rule set 132-2; or a set of descriptions about the changes between the first interpretable rule set 132-1 and the second interpretable rule set 132-2.

The similarities and differences between interpretable rule sets 132 can be distinguished in two distinct ways. On one hand, two rules may have few or no features in common but may be satisfied by very similar populations due to strong correlation. The reverse is also true: for example, the populations satisfying (age>26 AND education='Masters') and (age<26 AND education='Masters') have no overlap but the rules are semantically similar. As a consequence, the rules comparator 140 considers two similarity measures when comparing the first interpretable rule set 132-1 and the second interpretable rule set 132-2: i) statistical similarity and ii) semantic similarity.

The rules comparator 140 uses the similarity measures to generate the difference metric between the first interpretable rule set 132-1 and the second interpretable rule set 132-2. For example, the rules comparator 140 may order the first interpretable rule set 132-1 and the second interpretable rule set 132-2 so that each rule in the second interpretable rule set 132-2 occupies the same position as the rule in the first interpretable rule set 132-1 that shares the highest number of common literals. The rules comparator 140 may also organize the first interpretable rule set 132-1 and the second interpretable rule set 132-2 so that literals within a rule are sorted based on a predefined ordering of the variables (e.g., alphabetic order, frequency with which the variable occurs in the decision rules). The rules comparator 140 may also generate the difference metric as a Longest Common Subsequence (LCS) problem where the two ordered rulesets represent the sequences. The difference metric from the rules comparator 140 may thus provide two textual representations representing the first interpretable rule set 132-1 and the second interpretable rule set 132-2, the data set 122, or the first machine learning model 124-1 and the second machine learning model 124-2. The rules comparator 140 may also generate the difference metric as an edit distance of the first interpretable rule set 132-1 and the second interpretable rule set 132-2. For example, the rules comparator 140 could calculate a Levenshtein distance between related conjunctions.

The embodiments disclosed herein serve as a useful process of understanding a broad variety of machine learning models. As described above, various machine learning models, rules generators, and rules comparators may be used to give a user an interpretable understanding of the model-predicted labels assigned by the machine learning models. In a specific example, the embodiments disclosed herein provide a user with enlightenment concerning the distribution of the new data that can fundamentally change (and potentially affect the performance of) a model that is trained on an old dataset. To detect such data changes and provide a user with a difference metric, the embodiments disclosed herein use rules generators to classify the data according to a set of conjunctions. A rules comparator then compares two sets of rules to determine a difference metric and present the difference metric to the user.

Figure 6:
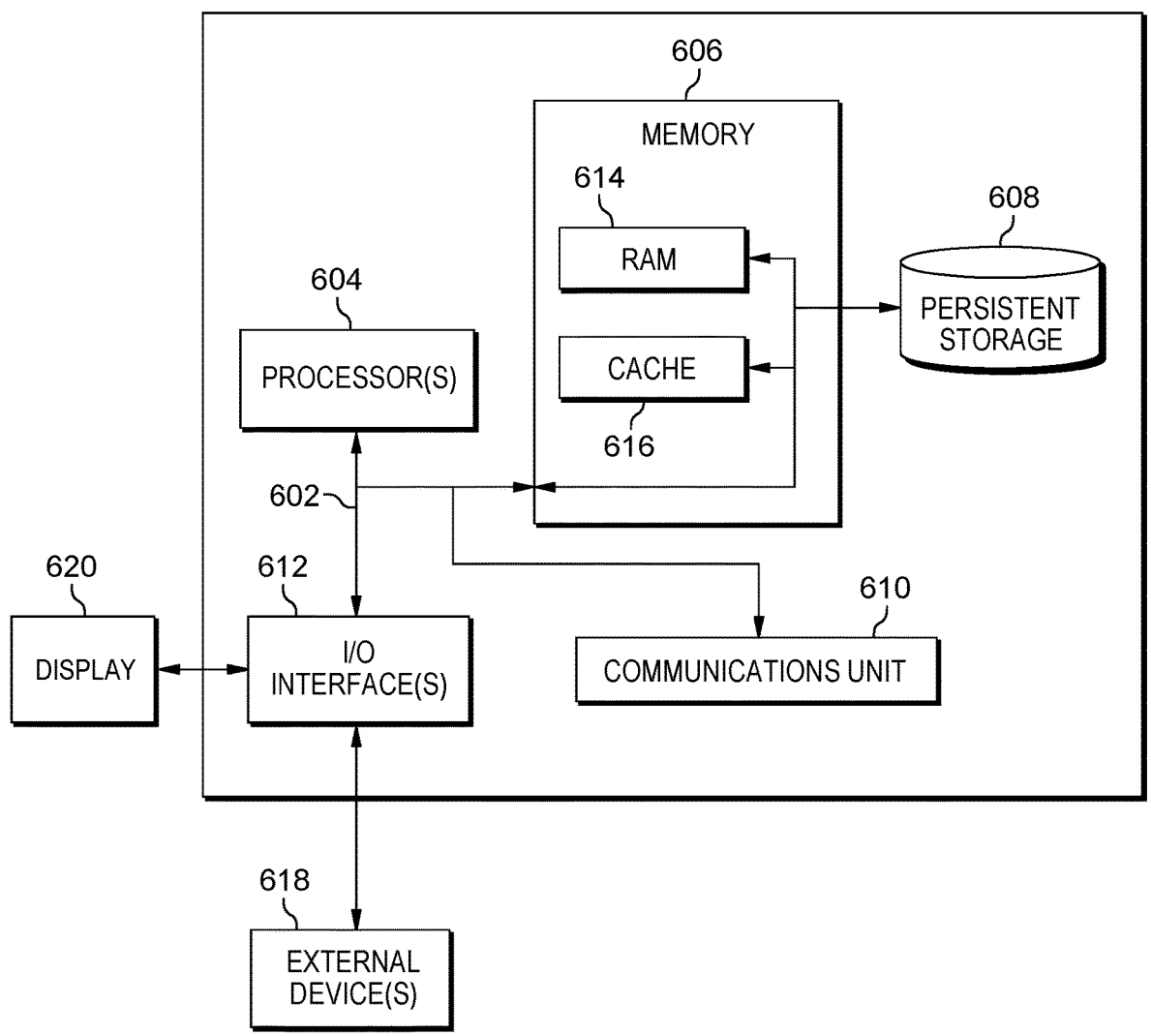
FIG. 6 is a block diagram of components of the computational components, in accordance with an embodiment of the present invention.

FIG. 6 depicts a block diagram of components of the machine learning model environment 100 in accordance with an illustrative embodiment of the present invention. It should be appreciated that FIG. 6 provides only an illustration of one implementation of one of the user input device 102, the rules comparator device 104, the rules generator device 106, the machine learning model device 108, the communication network 110, the data storage device 120, or any combination of these devices and does not imply any limitations with regard to the environments in which different embodiments may be implemented. Many modifications to the depicted environment may be made.

Each of the user input device 102, the rules comparator device 104, the rules generator device 106, the machine learning model device 108, the communication network 110, the data storage device 120, or any combination of these devices may include communications fabric 602, which provides communications between RAM 614, cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

The rules generator 130 and/or the rules comparator 140 may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. The rules generator 130 and/or the rules comparator 140 may be downloaded to persistent storage 608 through communications unit 610.

I/O interface(s) 612 allows for input and output of data with other devices that may be connected to server computer. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention (e.g., rules generator 130, the rules comparator 140, the datasets 122, the machine learning models 124, model-predicted labels, and/or interpretable rule sets) can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating a difference metric for a machine learning model, comprising:
   receiving, by one or more processors, a first interpretable rule set comprising first reasons for categorizing data;
   generating model-predicted labels from a dataset using the machine learning model;
   generating a second interpretable rule set comprising second reasons for categorizing data, by using an objective function to map literals between the dataset and the model-predicted labels while imposing grounding constraints that introduce a penalty term in the objective function to make the first interpretable rules set more likely to persist in the second interpretable rules set;
   generating a difference metric and mapping between the first interpretable rule set and the second interpretable rule set; and
   updating the machine learning model with additional data based on the difference metric being within a range.

2. The method of claim 1, wherein the difference metric comprises a selection from a group consisting of a comparison view highlighting the differences between the first interpretable rule set and the second interpretable rule set, an edit distance between the first interpretable rule set and the second interpretable rule set, and a set of descriptions about the changes between the first interpretable rule set and the second interpretable rule set.

3. The method of claim 1, wherein the first interpretable rule set comprises user-designated rules.

4. The method of claim 1, wherein the first interpretable rule set comprises rules based on ground truth labels.

5. The method of claim 1, wherein the first interpretable rule set comprises rules generated from the dataset and first model-predicted labels classifying the dataset.

6. The method of claim 1, wherein the labels comprise binarized features, wherein the binarized features are binarized by a selection from a group consisting of: thresholding and one-hot encoding.

7. A computer program product comprising:
   one or more computer readable storage media, and program instructions collectively stored on the one or more computer readable storage media, the program instructions comprising:
   program instructions to receive a first interpretable rule set comprising first reasons for categorizing data;
   program instructions to generate model-predicted labels from a dataset using the machine learning model;
   program instructions to generate a second interpretable rule set comprising second reasons for categorizing data, by using an objective function to map literals between the dataset and the model-predicted labels while imposing grounding constraints that introduce a penalty term in the objective function to make the first interpretable rules set more likely to persist in the second interpretable rules set;
   program instructions to generate a difference metric and mapping between the first interpretable rule set and the second interpretable rule set; and
   program instructions to update the machine learning model with additional data based on the difference metric being within a range.

8. The computer program product of claim 7, wherein the difference metric comprises a selection from a group consisting of a comparison view highlighting the differences between the first interpretable rule set and the second interpretable rule set, an edit distance between the first interpretable rule set and the second interpretable rule set, and a set of descriptions about the changes between the first interpretable rule set and the second interpretable rule set.

9. The computer program product of claim 7, wherein the first interpretable rule set comprises user-designated rules.

10. The computer program product of claim 7, wherein the first interpretable rule set comprises rules based on ground truth labels.

11. The computer program product of claim 7, wherein the first interpretable rule set comprises rules generated from the dataset and first model-predicted labels classifying the dataset.

12. The computer program product of claim 7, wherein the labels comprise binarized features, wherein the features are binarized by a selection from a group consisting of: thresholding and one-hot encoding.

13. A computer system comprising:
   one or more computer processors, one or more computer readable storage media, and program instructions collectively stored on the one or more computer readable storage media for execution by at least one of the one or more computer processors, the program instructions comprising:
   program instructions to receive a first interpretable rule set comprising first reasons for categorizing data;
   program instructions to generate model-predicted labels from a dataset using the machine learning model;
   program instructions to generate a second interpretable rule set comprising second reasons for categorizing data, by using an objective function to map literals between the dataset and the model-predicted labels while imposing grounding constraints that introduce a penalty term in the objective function to make the first interpretable rules set more likely to persist in the second interpretable rules set;

program instructions to generate a difference metric and mapping between the first interpretable rule set and the second interpretable rule set; and program instructions to update the machine learning model with additional data based on the difference metric being within a range.

14. The computer system of claim 13, wherein the difference metric comprises a selection from a group consisting of a comparison view highlighting the differences between the first interpretable rule set and the second interpretable rule set, an edit distance between the first interpretable rule set and the second interpretable rule set, and a set of descriptions about the changes between the first interpretable rule set and the second interpretable rule set.

15. The computer system of claim 13, wherein the first interpretable rule set comprises user-designated rules.

16. The computer system of claim 13, wherein the first interpretable rule set comprises rules based on ground truth labels.

17. The computer system of claim 13, wherein the first interpretable rule set comprises rules generated from the dataset and first model-predicted labels classifying the dataset.

18. The computer system of claim 13, wherein the labels comprise binarized features, wherein the features are binarized by a selection from a group consisting of: thresholding and one-hot encoding.

19. A computer-implemented method for generating a difference metric between a first machine learning model and a second machine learning model, comprising:

receiving, by one or more processors, a first interpretable rule set comprising first reasons for categorizing data generated from a dataset and first model-predicted labels from the first machine learning model classifying the dataset;

receiving a second interpretable rule set comprising second reasons for categorizing data generated by an objective function operating on the dataset and second model-predicted labels from the second machine learning model classifying the dataset while imposing grounding constraints that introduce a penalty term in the objective function to make the first interpretable rules set more likely to persist in the second interpretable rules set;

generating a difference metric and mapping between the first interpretable rule set and the second interpretable rule set; and updating the second machine learning model with additional data based on the difference metric being within a range.

20. A computer-implemented method for generating a difference metric between a first machine learning model and a second machine learning model, comprising:

generating first model-predicted labels from a dataset using the first machine learning model;

generating a first interpretable rule set comprising first reasons for categorizing data by comparing the dataset with the first model-predicted labels;

generating second model-predicted labels from the dataset using the second machine learning model;

generating a second interpretable rule set comprising second reasons for categorizing data using an objective function comparing the dataset with the second model-predicted labels while imposing grounding constraints that introduce a penalty term in the objective function to make the first interpretable rules set more likely to persist in the second interpretable rules set;

generating a difference metric and mapping between the first interpretable rule set and the second interpretable rule set; and updating the second machine learning model with additional data based on the difference metric being within a range.

* * * * *